United States Patent
Divecha et al.

(10) Patent No.: US 10,173,934 B1
(45) Date of Patent: Jan. 8, 2019

(54) PREPARATION OF CERAMIC/GLASS COMPOSITES FOR HIGH TEMPERATURE STRUCTURAL APPLICATIONS

(75) Inventors: Amarnath P. Divecha, Falls Church, VA (US); Subash Karmarkar, Great Falls, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/604,195

(22) Filed: Apr. 25, 1984

(51) Int. Cl.
*C04B 41/45* (2006.01)

(52) U.S. Cl.
CPC .................................... *C04B 41/45* (2013.01)

(58) Field of Classification Search
CPC .................................. C04B 41/45; C08J 9/35
USPC ........ 428/304.4, 306.6, 307.7, 367; 427/244, 427/294; 264/43, 44, 48
See application file for complete search history.

(56) References Cited

U.S. PATENT DOCUMENTS

| | | | | |
|---|---|---|---|---|
| 2,227,770 A | * | 1/1941 | Ungewiss | 428/312.6 |
| 3,090,094 A | * | 5/1963 | Schwartzwalder et al. | 264/44 |
| 3,253,952 A | * | 5/1966 | Merry et al. | 427/294 |
| 3,451,841 A | * | 6/1969 | Keston | C03C 10/0054 427/244 |
| 3,492,153 A | * | 1/1970 | Ervin, Jr. | C04B 35/52 252/516 |
| 3,495,939 A | * | 2/1970 | Forrest | C04B 35/573 257/77 |
| 3,513,019 A | * | 5/1970 | Miller et al. | 428/367 |
| 3,825,468 A | * | 7/1974 | Wojcik et al. | 428/312.6 |
| 4,173,609 A | * | 11/1979 | Engström | 264/43 |
| 4,187,344 A | * | 2/1980 | Fredriksson | 428/307.7 |
| 4,338,368 A | * | 7/1982 | Lovelace et al. | 428/307.7 |

* cited by examiner

*Primary Examiner* — Humera N Sheikh
*Assistant Examiner* — Julia L Rummel
(74) *Attorney, Agent, or Firm* — Kenneth E. Walden; Frederick A. Wein

(57) ABSTRACT

A method of producing a novel ceramic foam by treating a commercial ceramic foam with powdered glass in an aqueous/alcohol glass gel and with combined silicon carbide whiskers, where the impregnated foam is dried and sintered to form a porous article.

8 Claims, 1 Drawing Sheet

PREPARATION OF CERAMIC/GLASS COMPOSITES FOR HIGH TEMPERATURE STRUCTURAL APPLICATIONS

TECHNICAL FIELD

The invention relates to porous refractory articles made of several specific foam materials that are treated with and impregnated with glass and silicon carbide whiskers.

SUMMARY OF THE INVENTION

The invention and basis of the invention is to utilize commercially available foams comprising silicon carbide (SiC), silicon nitride $Si_3N_4$ foam and aluminum oxide $Al_2O_3$ foam and other equivalent foamed ceramics and to combine these ceramic foams with a suitable glass matrix that is subsequently sintered at 800° C. or higher for a short period of time to obtain a composite material. The above composition may be modified in the preferred embodiment by the addition of silicon carbide whiskers or other equivalent whiskers to the glass composition. The composite material obtained would be as high in strength and modulus as the composites containing silicon carbide yarn combined with glass fibers of the type produced by the United Technology Research Center.

The most important feature of the invention is that the composite possesses high fracture toughness properties. These toughness properties may be obtained in a much cheaper and more reliable process and method to be described hereinafter.

OBJECTS OF THE INVENTION

It is one object of the invention to provide a light weight strong fracture tough composite ceramic material.

It is a still further object of the invention to provide a light weight strong fracture tough material that has greater fracture toughness than standard ceramics.

It is one additional object of the invention to provide a novel method for producing a porous foam ceramic material impregnated with powdered glass that is sintered at high temperature to form a single body composite.

It is one further object of the invention to provide a method for impregnating a ceramic foam material where the pores are inner connected, further, some pores have spherical porosity with a reinforced glass gel, where the reinforcement is furnished by silicon carbide whiskers.

The bases of this invention is to utilize commercially available foams comprising silicon carbide, aluminum oxide and silicon nitride and other commercial available ceramic foams and to impregnate the said foams with a powdered glass gel that may or may not be reinforced with silicon carbide whiskers. The process of this invention takes advantage of the low cost of the foams and combines these ceramic foams with a suitable glass matrix. The composite obtained thus would probably be as high in strength and modulus as the silicon carbide yarn/glass composites. Of even more importance, the composites prepared by the methods of this invention are much cheaper than similar composite materials prepared via other methods and also they are much more reliable.

Figure 1:
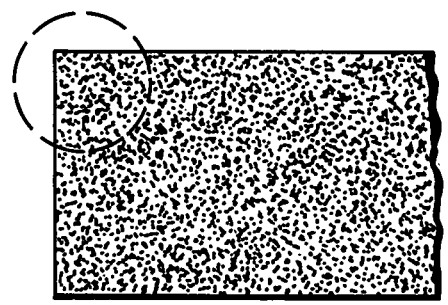
FIG. 1 shows the foam of this invention impregnated with powdered glass and silicon carbide whiskers.
Figure 2:
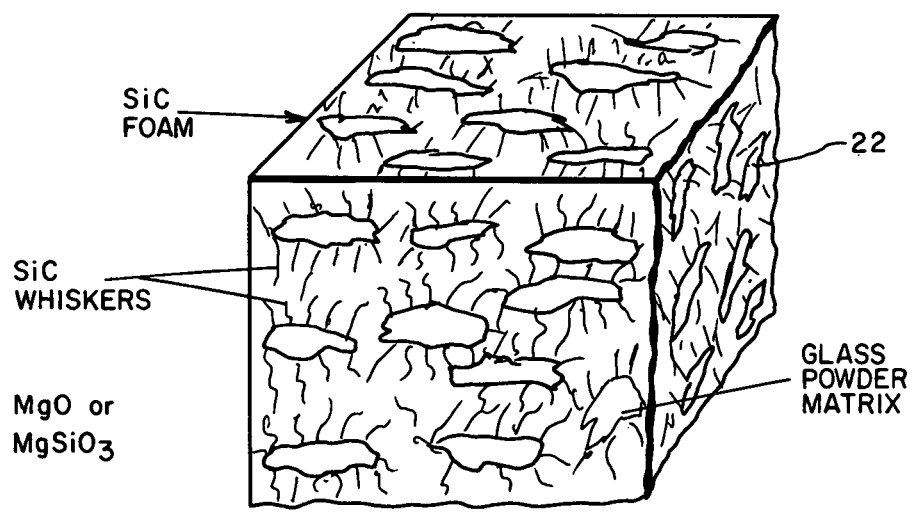
FIG. 2 is a cutaway section of FIG. 1 that has been expanded to illustrate the composite foam containing silicon carbide whiskers in the outer matrix and a magnesium oxide or magnesium oxide silicate coating.

Silicon carbide, silicon nitride, and aluminum oxide ceramic foams having a porosity of from 100 to 90 volume percent and completely interconnecting pores which are from 5 to 100 microns, preferably from 30 to 100 microns, and more preferably from 50 to 80 microns in diameter are commercially available as standard products. These commercial foams are available in various shapes and forms. The most prominent manufacturers are the Norton Company of Boston, Mass. and Ferro Company located near Niagara Falls, N.Y. These commercial foams have inner connecting porosity of controlled size and shape that enables free passage of corrosive fluids and liquids such as sulfuric, nitric acid and so forth. In fact the inner connective pores may have spherical sections as best shown in FIG. 2 at number 22.

In addition it is possible to purchase these filters in flat round and conical configurations as dictated by the processing equipment. When examined under the microscope it is revealed that the structure is analogous to a sponge and is in fact spongy in appearance under a microscope.

The ceramic whiskers and fibers used in this invention are usually selected from the group consisting of SiC, $Si_3N_4$, $Al_2O_3$, and $B_4C$.

BRIEF DESCRIPTION OF THE METHOD

The method of this invention comprises treating a commercial foam that may be a suitable silicon carbide, silicon nitride or aluminum oxide foam with a powdered glass composition.

The foam generally has numerous openings and pores that can take up from 10 to 90% of the volume of the foam and the size of the openings are generally, but not necessarily, circular in cross section varying from about 5 microns to 100 microns in diameter. In one preferred embodiment the inner connective pores that are completely connected from one face of the foam to the other face. The process steps in general comprise (1) providing a suitable ceramic foam with completely inner connective pores, (2) impregnatingly dipping the foam into a glass gel. The gel being made up of a liquid suspension of powdered glass particles, preferably having a diameter of from 1 to 5 microns, in a liquid that may comprise water, ethyl alcohol or any other suitable liquid in which the glass powder will float and retain its suspension qualities, and (3) after dipping the foam into the gel the foam is then evacuated in a heavy vacuum. The vacuum will usually vary between 1 and 30 mm and thereby completely pack and fill all porous openings in the foam with the glass gel. (4) In a subsequent step, more glass gel may be provided if desired but is not absolutely necessary so long all pores are completely filled with the glass gel. (5) the impregnated foam is then sintered while being pressed at temperatures varying between 700° C. and 1000° C. This step may be expanded by pressing from 30 minutes to 2 hours at a pressing pressure of 2000 psi to 10,000 psi while applying temperatures at of 700° C. to 1000° C. The product obtained thus has superior fracture toughness and is an ideal material for use in space vehicles and space structures.

EXAMPLE 1

A commercially available SiC foam in the form of a disc measuring ¼" thick by 1¼" in diameter is first dipped into a glass gel composition. The impregnation of the SiC foam is made brought about by dipping the foam in a liquid suspension of powdered glass and glass gel. Typically the liquid is isopropanol with 25-30% of glass powder with average particle diameter of 1-5 microns. The SiC foam with a pore size of 50-80 microns is easily penetrated by the glass 'gel' or other powdered glass solution or suspension. To assure complete impregnation of the SiC foam, the solution is placed in a vacuum environment to remove any trapped air inside the foam. The pressure difference causes all the air in the foam to be occupied by the glass gel.

The glass gel impregnated foam is then dried thoroughly and sandwiched between two discs of cold pressed glass powder. The sandwich is placed in a die and hot pressed at 900°-1100° at 5000 psi, for one hour in vacuum. The purpose of the excess glass powder is to assure a plentiful supply of glass matrix to encapsulate every pore in the SiC foam.

When SiC whiskers are needed for added reinforcement, the same procedure may be followed except that 15 volume percent of SiC whiskers are added to the glass powder 'gel'. These whiskers which measure 0.2 microns in diameter by 15-20 microns in length are sufficiently small to flow into the SiC foam pores during initial impregnation step. Subsequently, the dried, impregnated foam is sandwiched between cold pressed glass discs and hot pressed as described.

EXAMPLE 2

A SiC foam measuring 2 inches round by ½ thick is (1) treated with an alcohol containing 20% glass powder averaging 0.3 microns in diameter and 10% SiC whiskers. The foam has pores averaging 30-100 microns in size. The impreganation step takes 20 minutes and is conducted in a vacuum of 10 mm of mercury.

(2) the impregnated foam is dried at 125° C. for 1 hour and (3) the foam is then compressed to a 2 inch diameter and ¼ inch thickness and all pores are destroyed.

(4) the crushed foam is sintered at 1000° C. for 40 minutes at a pressure of 2000 psi to produce homogenous uniform products.

Other equivalent foams may be impreganated with powdered glass and whiskers in equivalent aqueous/alcohol gels and dried and sintered at other equivalent temperatures within the scope of this invention by any person skilled in the art.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process for producing glass-ceramic composite material comprising the following steps:
   (1) impregnating a ceramic foam selected from the group consisting of SiC, $Si_3N_4$, and $Al_2O_3$ foams having a porosity of from 10 to 90 volume percent and completely interconnecting pores which are from 5 to 100 microns in diameter with a glass gel comprising glass particles which are from 1 to 5 microns in diameter suspended in a liquid selected from the group consisting of water, ethyl alcohol, isopropyl alcohol, and mixtures thereof until the pores of the ceramic foam are filled with the glass particles;
   (2) heating the glass particle filled ceramic foam at a temperature of from 100 to 350° C. until the liquid has been evaporated from the pores of the ceramic foam;
   (3) compressing the glass particle filled ceramic foam to a volume of from 10 to 80 percent of the original volume of the ceramic foam; and
   (4) sintering the compressed glass particle filled ceramic foam at a temperature of from 900 to 1100° C. under high pressure to obtain a fully densified glass-ceramic composite.

2. The process of claim 1 wherein the glass gel used in step (1) further comprises ceramic whiskers selected from the group consisting of SiC whiskers, $Si_3N_4$ whiskers, $Al_2O_3$ whiskers, $B_4C$ whiskers, and mixtures thereof.

3. The process of claim 2 wherein the ceramic whiskers are approximate 0.2 microns in diameter and are from about 15 to about 20 microns in length.

4. The process of claim 1 wherein a vacuum is used to pull the glass gel into the pores of the ceramic foam in step (1).

5. The product produced by the process of claim 1.

6. The product produced by the process of claim 2.

7. The process of claim 1 wherein the pores of the ceramic foam are from 30 to 100 microns in diameter.

8. The process of claim 7 wherein the pores of the ceramic foam are from 50 to 80 microns in diameter.

* * * * *